(12) United States Patent
Beeler et al.

(10) Patent No.: US 9,178,607 B2
(45) Date of Patent: Nov. 3, 2015

(54) SYSTEM AND METHOD FOR SATELLITE LINK BUDGET ANALYSIS (LBA) OPTIMIZATION

(71) Applicant: Comtech EF Data Corp., Tempe, AZ (US)

(72) Inventors: Michael Beeler, Jefferson, MD (US); Vasile Manea, Potomac, MD (US); Joshua Bolick, Phoenix, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 140 days.

(21) Appl. No.: 14/179,764

(22) Filed: Feb. 13, 2014

(65) Prior Publication Data

US 2014/0160970 A1 Jun. 12, 2014

Related U.S. Application Data

(60) Provisional application No. 61/907,305, filed on Nov. 21, 2013.

(51) Int. Cl.
*H04B 7/185* (2006.01)
*H04W 24/02* (2009.01)

(52) U.S. Cl.
CPC .................. *H04B 7/18519* (2013.01)

(58) Field of Classification Search
None
See application file for complete search history.

(56) References Cited

U.S. PATENT DOCUMENTS

| | | | | |
|---|---|---|---|---|
| 2008/0274690 A1* | 11/2008 | Laufer | ............... | H04B 7/18515 455/13.4 |
| 2012/0188880 A1* | 7/2012 | Beeler | ................... | H04L 41/145 370/246 |

* cited by examiner

*Primary Examiner* — Kevin C Harper
*Assistant Examiner* — Derrick V Rose
(74) *Attorney, Agent, or Firm* — Booth Udall Fuller, PLC

(57) ABSTRACT

A method of optimizing a link budget analysis (LBA) for a link comprising performing a first LBA based on a target modulation and coding pair (MODCOD) based on one or more link parameters, the MODCOD having a predetermined symbol energy to noise density ratio (Es/No), calculating a ratio of allocated bandwidth to a power equivalent bandwidth (PEB) for the link and converting the ratio to Decibels, determining whether additional energy is present by summing the Es/No for the link at the target MODCOD and the calculated ratio of allocated bandwidth to PEB, accessing a look up table to determine an optimal MODCOD for the link wherein if the sum is a positive value, selecting a MODCOD having a higher Es/No and if the sum is a negative value, selecting a MODCOD having a lower Es/No and altering one or more transmission or receiving parameters to apply the selected optimal MODCOD.

20 Claims, 16 Drawing Sheets

| CALCULATIONS AT SATURATION | VALUE | | | UNITS |
|---|---|---|---|---|
| Gain 1m^2 | 44.53 | | | dB/m2 |
| Uplink C/No | 108.07 | | | dB.Hz |
| Downlink C/No | 112.37 | | | dB.Hz |
| Total C/No | 106.85 | | | dB.Hz |
| Uplink EIRP for saturation | 73.08 | | | dBW |
| Effective SFD | -90 | | | dBW/m² |

| GENERAL CALCULATIONS | UP | DOWN | | UNITS |
|---|---|---|---|---|
| Elevation | 34 | 34 | | degrees |
| True azimuth | 237.17 | 237.17 | | degrees |
| Compass bearing | 232.99 | 232.99 | | degrees |
| Path distance to satellite | 38363.88 | 38363.88 | | km |
| Propagation time delay | 0.127634 | 0.127634 | | seconds |
| Antenna efficiency | 0.12 | 31.34 | | % |
| Antenna gain | 25 | 56 | | dBi |
| Availability (average year) | 99.95 | 99.95 | | % |
| Link downtime (average year) | 4.383 | 4.383 | | hours |
| Availability (worst month) | 99.79 | 99.79 | | % |
| Link downtime (worst month) | 1.537 | 1.537 | | hours |

| UPLINK CALCULATION | CLEAR | RAIN UP | RAIN DOWN | UNITS |
|---|---|---|---|---|
| Uplink transmit EIRP | 43.94 | 43.94 | 43.94 | dBW |
| Transponder input back-off (total) | 6.5 | 6.5 | 6.5 | dB |
| Input back-off per carrier | 13.9 | 16.98 | 13.9 | dB |
| Antenna mispoint | 0.3 | 0.3 | 0.3 | dB |
| Free space loss | 207.18 | 207.18 | 207.18 | dB |
| Atmospheric absorption | 0.14 | 0.22 | 0.14 | dB |
| Tropospheric scintillation fading | 0 | 0.47 | 0 | dB |
| Cloud attenuation | 0 | 0.12 | 0 | dB |
| Rain attenuation | 0 | 2.85 | 0 | dB |
| Total attenuation (gas-rain-cloud-scintillation) | 0.14 | 3.22 | 0.14 | dB |
| Other path losses | 0 | 0 | 0 | dB |
| Uplink power control | 0 | 0 | 0 | dB |
| Uncompensated fade | 0 | 3.08 | 0 | dB |
| C/No (thermal) | 78.92 | 75.84 | 78.92 | dB.Hz |
| C/N (thermal) | 9.05 | 5.97 | 9.05 | dB |
| C/ACI | 25.03 | 21.95 | 25.03 | dB |
| C/ASI | 6.53 | 3.45 | 6.53 | dB |
| C/XPI | 25.03 | 21.92 | 25.03 | dB |
| C/IM | 30.03 | 30.03 | 30.03 | dB |
| C/(N+I) ( = Es/No+Io) ) | 4.51 | 1.44 | 4.51 | dB |
| Eb/(No+Io) | 3.34 | 0.16 | 3.34 | dB |

FIG. 8A

| DOWNLINK CALCULATION | CLEAR | RAIN UP | RAIN DOWN | UNITS |
|---|---|---|---|---|
| Satellite EIRP total | 56 | 56 | 56 | dBW |
| Transponder output back-off (total) | 4.1 | 4.1 | 4.1 | dB |
| Output back-off per carrier | 11.5 | 14.58 | 11.5 | dB |
| Satellite EIRP per carrier | 44.5 | 41.42 | 44.5 | dBW |
| Antenna mispoint | 0.3 | 0.3 | 0.3 | dB |
| Free space loss | 205.65 | 205.65 | 205.65 | dB |
| Atmospheric absorption | 0.11 | 0.11 | 0.16 | dB |
| Tropospheric scintillation fading | 0 | 0 | 0.3 | dB |
| Cloud attenuation | 0 | 0 | 0.08 | dB |
| Rain attenuation | 0 | 0 | 1.89 | dB |
| Total attenuation (gas-rain-cloud-scintillation) | 0.11 | 0.11 | 2.16 | dB |
| Other path losses | 0 | 0 | 0 | dB |
| Noise increase due to precipitation | 0 | 0 | 2.25 | dB |
| Downlink degradation (DND) | 0 | 0 | 4.3 | dB |
| Total system noise | 134.01 | 134.01 | 225.12 | K |
| Figure of merit (G/T) | 34.43 | 34.43 | 32.18 | dB/K |
| C/No (thermal) | 101.47 | 98.39 | 97.17 | dB.Hz |
| C/N (thermal) | 31.6 | 28.52 | 27.3 | dB |
| C/ACI | 25.03 | 21.95 | 25.03 | dB |
| C/ASI | 30.03 | 26.95 | 30.03 | dB |
| C/XPI | 25.03 | 21.95 | 23 | dB |
| C/IM | 25 | 25 | 25 | dB |
| C/(N+I) [ = Es/(No+Io) ] | 19.53 | 17.13 | 18.49 | dB |
| Eb/(No+Io) | 18.26 | 15.86 | 17.22 | dB |

| TOTALS PER CARRIER (End-to-End) | CLEAR | RAIN UP | RAIN DOWN | Units |
|---|---|---|---|---|
| C/No (thermal) | 78.9 | 75.82 | 78.86 | dB.Hz |
| C/N (thermal) | 9.03 | 5.95 | 8.99 | dB |
| C/ACI | 22.02 | 18.94 | 22.02 | dB |
| C/ASI | 6.51 | 3.43 | 6.51 | dB |
| C/XPI | 22.02 | 18.93 | 20.89 | dB |
| C/IM | 23.81 | 23.81 | 23.81 | dB |
| C/I (total) | 6.3 | 3.15 | 6.16 | dB |
| C/(No+Io) | 74.24 | 71.19 | 74.21 | dB.Hz |
| C/(N+I) [ = Es/(No+Io) ] | 4.37 | 1.32 | 4.34 | dB |
| Eb/(No+Io) | 3.1 | 0.05 | 3.07 | dB |
| Implementation loss | 0 | 0 | 0 | dB |
| System margin | 0 | 0 | 0 | dB |
| Net Es/(No+Io) | 4.37 | 1.32 | 4.34 | dB |
| Required Es/(No+Io) | 1.32 | 1.32 | 1.32 | dB |
| Excess margin | 3.05 | 0 | 3.02 | dB |

FIG. 8B

| ERP DENSITY CALCULATIONS | CLEAR | RAIN UP | RAIN DOWN | Units |
|---|---|---|---|---|
| Flange transmit (up) | -51.93 | -51.93 | -51.93 | dBW/Hz |
| Satellite (down) | -25.37 | -28.46 | -25.37 | dBW/Hz |
| Flange receive (down) | -175.13 | -178.21 | -179.41 | dBW/Hz |

| EARTH STATION POWER REQUIREMENTS | VALUE | UNITS |
|---|---|---|
| EIRP per carrier | 41.94 | dBW |
| Antenna gain | 26 | dBi |
| Antenna feed flange power per carrier | 17.94 | dBW |
| Uplink power control | 0 | dB |
| HPA output back off | 0 | dB |
| Waveguide loss | 3 | dB |
| Number of HPA carriers | 1 | |
| Total HPA power required | 20.9389 | dBW |
| Required HPA power | 124.1342 | W |

| SPACE SEGMENT UTILIZATION | VALUE | UNITS |
|---|---|---|
| Overall availability | 99.9 | % |
| Information rate | 13 | Mbps |
| Information rate (inc overhead) | 13 | Mbps |
| Transmit rate | 13.403 | Mbps |
| Symbol rate | 9.7015 | Mbaud |
| Noise Bandwidth | 69.87 | dB.Hz |
| Occupied bandwidth | 13.087 | MHz |
| Minimum allocated bandwidth required | 13.097 | MHz |
| Allocated transponder bandwidth | 13.087 | MHz |
| Link efficiency | 0.993 | bps/Hz |
| Percentage transponder bandwidth used | 18.19 | % |
| Used transponder power | 44.5 | dBW |
| Percentage transponder power used | 18.18 | % |
| Max carriers / transponder | 5.5 | |
| Limited by: | Bandwidth | |
| Power equivalent bandwidth usage | 13.0909 | MHz |

| MODCOD | QPSK 1/4 | QPSK 1/3 | QPSK 2/5 | QPSK 1/2 | QPSK 3/5 | QPSK 2/3 | QPSK 3/4 | QPSK 4/5 | QPSK 5/6 | QPSK 8/9 | QPSK 9/10 | 8PSK 3/5 | 8PSK 2/3 | 8PSK 3/4 |
|---|---|---|---|---|---|---|---|---|---|---|---|---|---|---|
| Mod. Index | 4 | 4 | 4 | 4 | 4 | 4 | 4 | 4 | 4 | 4 | 4 | 8 | 8 | 8 |
| FEC | 0.2500 | 0.3330 | 0.4000 | 0.5000 | 0.6000 | 0.6667 | 0.7500 | 0.8000 | 0.8333 | 0.8889 | 0.9000 | 0.7500 | 0.6667 | 0.7500 |
| Efficiency | 0.479 | 0.641 | 0.771 | 0.965 | 1.160 | 1.291 | 1.452 | 1.549 | 1.615 | 1.724 | 1.746 | 1.740 | 1.936 | 2.178 |
| Es/No | -2.10 | -1.00 | 0.00 | 1.30 | 2.60 | 3.50 | 4.60 | 5.20 | 5.60 | 6.70 | 6.90 | 6.30 | 7.20 | 8.50 |

| MODCOD | 8PSK 5/6 | 8PSK 8/9 | 8PSK 9/10 | 16APSK 2/3 | 16APSK 3/4 | 16APSK 4/5 | 16APSK 5/6 | 16APSK 8/9 | 16APSK 9/10 | 32APSK 3/4 | 32APSK 4/5 | 32APSK 5/6 | 32APSK 8/9 | 32APSK 9/10 |
|---|---|---|---|---|---|---|---|---|---|---|---|---|---|---|
| Mod. Index | 8 | 8 | 8 | 16 | 16 | 16 | 16 | 16 | 16 | 32 | 32 | 32 | 32 | 32 |
| FEC | 0.8333 | 0.8889 | 0.9000 | 0.6667 | 0.7500 | 0.8000 | 0.8333 | 0.8889 | 0.9000 | 0.7500 | 0.8000 | 0.8333 | 0.8889 | 0.9000 |
| Efficiency | 2.422 | 2.586 | 2.618 | 2.575 | 2.896 | 3.090 | 3.222 | 3.440 | 3.483 | 3.623 | 3.866 | 4.031 | 4.303 | 4.357 |
| Es/No | 9.80 | 11.03 | 11.33 | 9.64 | 10.29 | 11.54 | 12.18 | 13.48 | 13.75 | 14.01 | 15.25 | 16.18 | 18.20 | 18.70 |

FIG. 13

| SPACE SEGMENT UTILIZATION | VALUE | UNITS |
|---|---|---|
| Overall availability | 99.301 | % |
| Information rate | 17.7696 | Mbps |
| Information rate (inc overhead) | 17.7696 | Mbps |
| Transmit rate | 44.4240 | Mbps |
| Symbol rate | 22.2120 | Mbaud |
| Noise Bandwidth | 73.47 | dB.Hz |
| Occupied bandwidth | 29.9862 | MHz |
| Minimum allocated bandwidth required | 29.9862 | MHz |
| Allocated transponder bandwidth | 29.9862 | MHz |
| Link efficiency | 0.593 | bps/Hz |
| Percentage transponder bandwidth used | 83.29 | % |
| Used transponder power | 42.12 | dBW |
| Percentage transponder power used | 27.60 | % |
| Max carriers / transponder | 1.20 | |
| Limited by: | Bandwidth | |
| Power equivalent bandwidth usage | 9.9369 | MHz |

FIG. 14

| SPACE SEGMENT UTILIZATION | VALUE | UNITS |
|---|---|---|
| Overall availability | 99.301 | % |
| Information rate | 17.7696 | Mbps |
| Information rate (inc overhead) | 17.7696 | Mbps |
| Transmit rate | 44.4240 | Mbps |
| Symbol rate | 22.2120 | Mbaud |
| Noise Bandwidth | 73.47 | dB.Hz |
| Occupied bandwidth | 29.9862 | MHz |
| Minimum allocated bandwidth required | 29.9862 | MHz |
| Allocated transponder bandwidth | 29.9862 | MHz |
| Link efficiency | 0.593 | bps/Hz |
| Percentage transponder bandwidth used | 83.29 | % |
| Used transponder power | 41.34 | dBW |
| Percentage transponder power used | 46.12 | % |
| Max carriers / transponder | 1.20 | |
| Limited by: | Bandwidth | |
| Power equivalent bandwidth usage | 16.6039 | MHz |

SYSTEM AND METHOD FOR SATELLITE LINK BUDGET ANALYSIS (LBA) OPTIMIZATION

CROSS REFERENCE TO RELATED APPLICATIONS

This document claims the benefit of the filing date of U.S. Provisional Patent Application No. 61/907,305, entitled "Optimization Techniques for Satellite Link Budget Analysis (LBA)" to Michael Beeler et al., which was filed on Nov. 21, 2013, the disclosure of which is hereby incorporated entirely by reference herein.

BACKGROUND

1. Technical Field

Aspects of this document relate generally to telecommunication systems and techniques for transmitting data across a telecommunication channel.

2. Background Art

Since the introduction of satellite communications, a recurring problem continuing to challenge the industry is how to tie a theoretical understanding of the communications path between one side of a communications path, over a satellite, and then from the satellite to the receiving station. The complexity of engineering a communications path or link between a station located on or near the earth and a space-based repeating relay is made complex, by many variables, such as the free-space path loss, the effects of weather (rain, atmospheric gasses, etc.), look angle to the satellite, ionospheric effects, troposphere effects, etc. These problems become more complex as the transmission frequency increases.

SUMMARY

Implementations of a method of optimizing a link budget analysis (LBA) for a communications link may comprise performing, using a processor, a first LBA based on a target modulation and coding pair (MODCOD) that is selected based on one or more transmission or receiving link parameters, the MODCOD having a predetermined symbol energy to noise density ratio (Es/No), calculating, using the processor, a ratio of allocated bandwidth to a power equivalent bandwidth (PEB) for the communications link and converting the calculated ratio to Decibels, determining whether additional energy is present in the communications link by summing the Es/No for the communications link at the target MODCOD and the calculated ratio of allocated bandwidth to PEB using the processor, accessing a look up table (LUT) to determine an optimal MODCOD for the communications link wherein if the sum is a positive value, selecting a MODCOD having a higher Es/No and if the sum is a negative value, selecting a MODCOD having a lower Es/No, and altering one or more transmission or receiving parameters to apply the selected optimal MODCOD.

Particular aspects may comprise one or more of the following features. The method may further comprise performing a second LBA using the optimal MODCOD. The allocated bandwidth and PEB may be substantially equal when the optimal MODCOD is used when performing the second LBA. The optimal MODCOD selected may have an Es/No that is a highest value among possible MODCODS without exceeding the sum of the Es/No of the target MODCOD and the calculated ratio of allocated bandwidth to PEB. The optimal MODCOD selected may have an Es/No that exceeds the sum of the Es/No of the target MODCOD and the calculated ratio of allocated bandwidth to PEB by an amount that is within a predetermined range of variance of the sum. The method may further comprise performing a plurality of first LBAs based on a plurality of target MODCODs for a plurality of communications links and summing the calculated ratios of allocated bandwidth to PEB for all of the communications links to result in a total allocated bandwidth and a total PEB. The method may further comprise performing a plurality of first LBAs based on a plurality of target MODCODs for a plurality of links sharing a common transmission or receiving hub, calculating a ratio of allocated bandwidth to a power equivalent bandwidth (PEB) a maximum allocated bandwidth from among the plurality of links and a maximum PEB from among the plurality of links and converting the calculated ratio to Decibels, and determining whether additional energy is present in the plurality of communications links by summing the Es/No for the most disadvantaged communications link at the target MODCOD and the calculated ratio of allocated bandwidth to PEB based on the maximum allocated bandwidth and PEB from among the plurality of links. The communications link may be a forward link over which communications are transmitted from a local transmitter to a remote receiver. The communications link may be a return link over which communications are transmitted from a local receiver to a remote transmitter. The method may be performed using both a forward link over which communications are transmitted from a local transmitter to a remote receiver and a return link over which communications are transmitted from a local receiver to a remote transmitter. The predetermined range of variance may be a user-adjustable parameter.

Implementations of a system for optimizing a link budget analysis (LBA) for a communications link may comprise a transmitter configured to transmit a communications signal, a receiver configured to receive the communications signal and create a communications link between the transmitter and receiver, the receiver and transmitter located remotely from each other, and a processor configured to perform a first LBA based on a target modulation and coding pair (MODCOD) that is selected based on one or more transmission or receiving link parameters, the MODCOD having a predetermined symbol energy to noise density ratio (Es/No), calculate a ratio of allocated bandwidth to a power equivalent bandwidth (PEB) for the communications link and converting the calculated ratio to Decibels, determine whether additional energy is present in the communications link by summing the Es/No for the communications link at the target MODCOD and the calculated ratio of allocated bandwidth to PEB, access a look up table (LUT) to determine an optimal MODCOD for the communications link wherein if the sum is a positive value, a MODCOD having a higher Es/No is selected and if the sum is a negative value, a MODCOD having a lower Es/No is selected, and alter one or more transmission or receiving parameters to apply the selected optimal MODCOD.

Particular aspects may comprise one or more of the following features. The processor may be further configured to perform a second LBA using the optimal MODCOD. The allocated bandwidth and PEB may be substantially equal when the optimal MODCOD is used when the second LBA is performed. The optimal MODCOD selected has an Es/No that is a highest value among possible MODCODS without exceeding the sum of the Es/No of the target MODCOD and the calculated ratio of allocated bandwidth to PEB. The optimal MODCOD selected may have an Es/No that exceeds the sum of the Es/No of the target MODCOD and the calculated ratio of allocated bandwidth to PEB by an amount that is within a predetermined range of variance of the sum. The processor may be further configured to perform a plurality of first LBAs based on a plurality of target MODCODs for a plurality of communications links and sum the calculated ratios of allocated bandwidth to PEB for all of the communications links to result in a total allocated bandwidth and a total PEB. The processor may be further configured to perform a plurality of first LBAs based on a plurality of target MODCODs for a plurality of links sharing a common transmission or receiving hub, calculate a ratio of allocated bandwidth to a power equivalent bandwidth (PEB) a maximum allocated bandwidth from among the plurality of links and a maximum PEB from among the plurality of links and converting the calculated ratio to Decibels, and determine whether additional energy is present in the plurality of communications links by summing the Es/No for the most disadvantaged communications link at the target MODCOD and the calculated ratio of allocated bandwidth to PEB based on the maximum allocated bandwidth and PEB from among the plurality of links. The communications link may be a forward link over which communications are transmitted from a local transmitter to a remote receiver. The communications link may be a return link over which communications are transmitted from a local receiver to a remote transmitter. The processor may be further configured to use both a forward link over which communications are transmitted from a local transmitter to a remote receiver and a return link over which communications are transmitted from a local receiver to a remote transmitter. The predetermined range of variance may be a user-adjustable parameter.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112(f). Thus, the use of the words "function," "means" or "step" in the Description , Drawings, or Claims is not intended to somehow indicate a desire to invoke the special provisions of 35 U.S.C. §112(f), to define the invention. To the contrary, if the provisions of 35 U.S.C. §112(f) are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112(f). Moreover, even if the provisions of 35 U.S.C. §112 (f) are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIGS. 8A-C show an example of a link budget analysis (LBA) as known in the prior art.

FIG. 9 shows an implementation of a link budget analysis using an implementation of the described method in which a single LBA or a plurality of LBAs may be performed.

FIG. 10 shows an implementation of a LBA using an implementation of the described method that has been further optimized for both the forward and return communications links.

FIG. 13 shows a representative table showing characteristics of Digital Video Broadcast—Satellite Version 2 (DVB-S2) of each modulation and FEC coding format (MODCOD) and the associated modulation index, FEC, efficiency and required Es/No.

FIGS. 14-15 show examples of implementations of an outbound LBA with the Allocated Bandwidth and Power Equivalent Bandwidth in MHz use for performing an implementation of the disclosed method shown in bold.

DESCRIPTION

Figure 1:
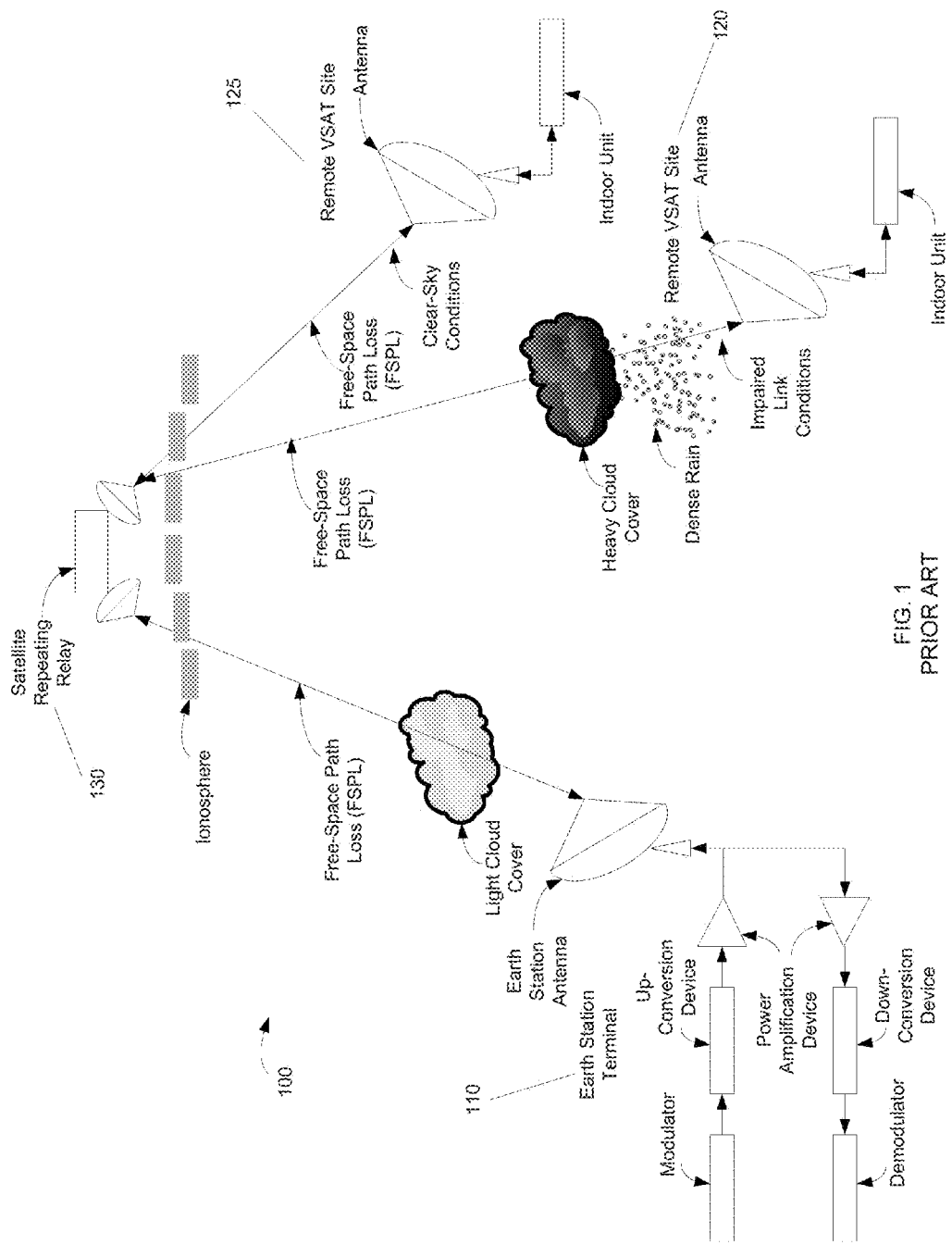
FIG. 1 shows a prior art configuration of a communications link operating over a satellite repeating relay.

This disclosure, its aspects and implementations, are not limited to the specific components, frequency examples, or methods disclosed herein. Many additional components and assembly procedures known in the art consistent with the optimization techniques for satellite link budget analysis (LBA) are in use with particular implementations from this disclosure. Accordingly, for example, although particular implementations are disclosed, such implementations and implementing components may comprise any components, models, versions, quantities, and/or the like as is known in the art for such systems and implementing components, consistent with the intended operation.

This disclosure relates to systems and methods for performing link budget analysis (LBA) optimization techniques to optimize satellite links. Implementations of the described methods provide procedures for analyzing and engineering a satellite link or links for optimal operation. The use of standard link budget analysis techniques may be the foundation of the invention, but the manner in which the LBAs are optimized, and the use of multiple links, are further used to compare one against another to allow the links be further optimized for best use of a satellite repeating relay's resources.

A typical communications satellite is comprised of one or a plurality of satellite transponders that receive communication from or near the earth. The received signal may be filtered, amplified, frequency converted, and sent back toward the earth. Engineering the links based on the free-space path loss, look angle to the satellite, weather effects, ionospheric effects, troposphere effects, etc. are well understood, but engineering the links in a manner that takes into account more than one link budget analysis (LBA) is the subject of this disclosure. The present disclosure covers how the standard LBA may be further enhanced, and consideration of multiple links to ensure all resources on or near the earth and the satellite repeating relay are fully optimized. Embodiments of the disclosed system and methods can be employed for an electromagnetic emitting device, such as Radio Frequency (RF) transmission equipment for point-to-point, point-to-multipoint and/or multipoint-to-multipoint operation.

This disclosure relates to, but is not limited to, providing optimization techniques for a link budget analysis (LBA) for a single link or a plurality of links and/or link budget analyses. Traditionally, a link budget analysis (LBA) is performed on a single link from a transmitting station, to a satellite repeating relay and then to a receiving station. In the existing art, an LBA must be done one at a time for every link. The optimization the transmission engineer strives to achieve is to ensure that required bandwidth, typically called "allocated bandwidth" is minimized and the required power equivalent bandwidth (PEB) is also minimized. In the art, the objective for the engineer is to ensure both allocated bandwidth and PEB are as small as possible, but ensure the link can meet the bandwidth requirements while achieving the desired availability of the link. For traditional link budgets, the analysis is performed by an engineer. The LBA input information may include 1) parameters about the transmit site such as for example, a type of equipment, an antenna size and/or capabilities of the amplifier; 2) parameters about the satellite such as for example, frequencies, power of the satellite, antenna size of the satellite; and 3) parameters about the receive site; type of equipment antenna size and capabilities of the low-noise amplifier. All of the aforementioned information is entered into the LBA, which may be a series of calculations, spread sheets or an executable computer program. The results of the analysis demonstrates the amount of loss or required gain to overcome the loss of the transmission link (attenuation) to support communications (close the link) over the link.

Implementations of the disclosed invention use the described techniques and results in one or a plurality of link budgets to further optimize the transmission parameters such as modulation, power, FEC and any common resources of the satellite equipment such as the transponder resources (bandwidth and power).

The algorithms used to estimate the physics of the link budget are extremely well understood, but the methods by which they are applied in a novel manner is the subject of this disclosure. Implementations of the method described provide the ability for someone skilled in the art, e.g., a satellite operator or transmission engineer/planner to gather information about the use of a transmission path and its resources.

Particular implementations of optimization techniques for satellite LBAs herein may be specifically employed in satellite communications systems. However, as will be clear to those of ordinary skill in the art from this disclosure, the principles and aspects disclosed herein may readily be applied to any electromagnetic (IF and RF) communications system, such terrestrial broadcast network without undue experimentation.

The methods described in this disclosure may employ digital signal processing (DSP) techniques such as power combining or splitting, frequency mixing, adaptive filtering or equalization, which can be easily implemented in passive and active power splitters and combiners, frequency mixing circuits, Field-Programmable Gate Array (FPGA), Programmable Logic Device (PLD), Programmable Integrated Circuit (PIC), Digital Signal Processor (DSP), Application Specific Integrated Circuit (ASIC) or microprocessors using conventional implementation methods known in the art with knowledge of this disclosure. Particular implementations described herein are and may use, but are not limited to, spread sheet programs, computer programming languages, or microprocessors.

FIG. 1 illustrates a particular implementation of a communications transmission carrier 100 wherein the forward path (earth station terminal 110 to remote VSAT site 120, 125) may be modulated to intermediate frequency (IF) or radio frequency (RF), upconverted, amplified, and transmitted through free-space to a satellite repeating relay 130. At the satellite repeating relay 130, the carrier may be received, filtered, amplified, linearized, frequency converted, channelized, amplified, and transmitted through free-space to a ground station 120, 125. At the receiving station (remote VSAT) 120, 125, the carrier may be received, down converted, amplified, filtered, demodulated and decoded. For each path from the earth station terminal 110 to the satellite repeating relay 130 this is the "uplink path" (first-half) of the transmission path, and the "downlink path" from the satellite 130 to the remote VSAT site 120, 125 is the second-half of the link. The entire link budget is comprised of both the uplink and downlink paths. An example of a standard LBA is shown in FIG. 8, where all the variables are filled in to obtain an estimation of the link losses from the earth station terminal 110 to the satellite 130, and then from the satellite 130 to the receiving remote VSAT site 120, 125. If the transmission path is "bi-directional," a link budget may also be done from the transmitting remote VSAT site 120, 125 to the satellite 130, and from the satellite 130 to the earth station terminal 110.

One or ordinary skill in the art, this would be know this to be a return-link (or return channel) link budget analysis.

Figure 2:
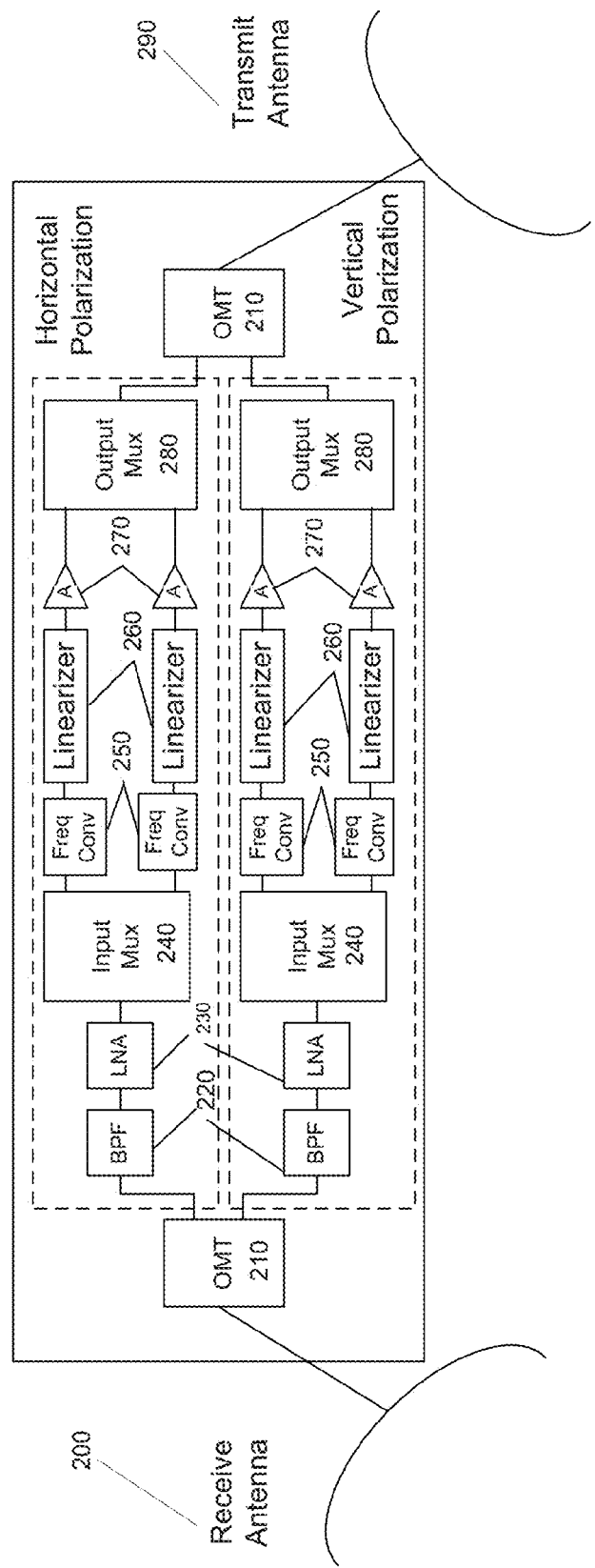
FIG. 2 shows an implementation of a typical satellite repeating relay as found in the prior art.
Figure 3:
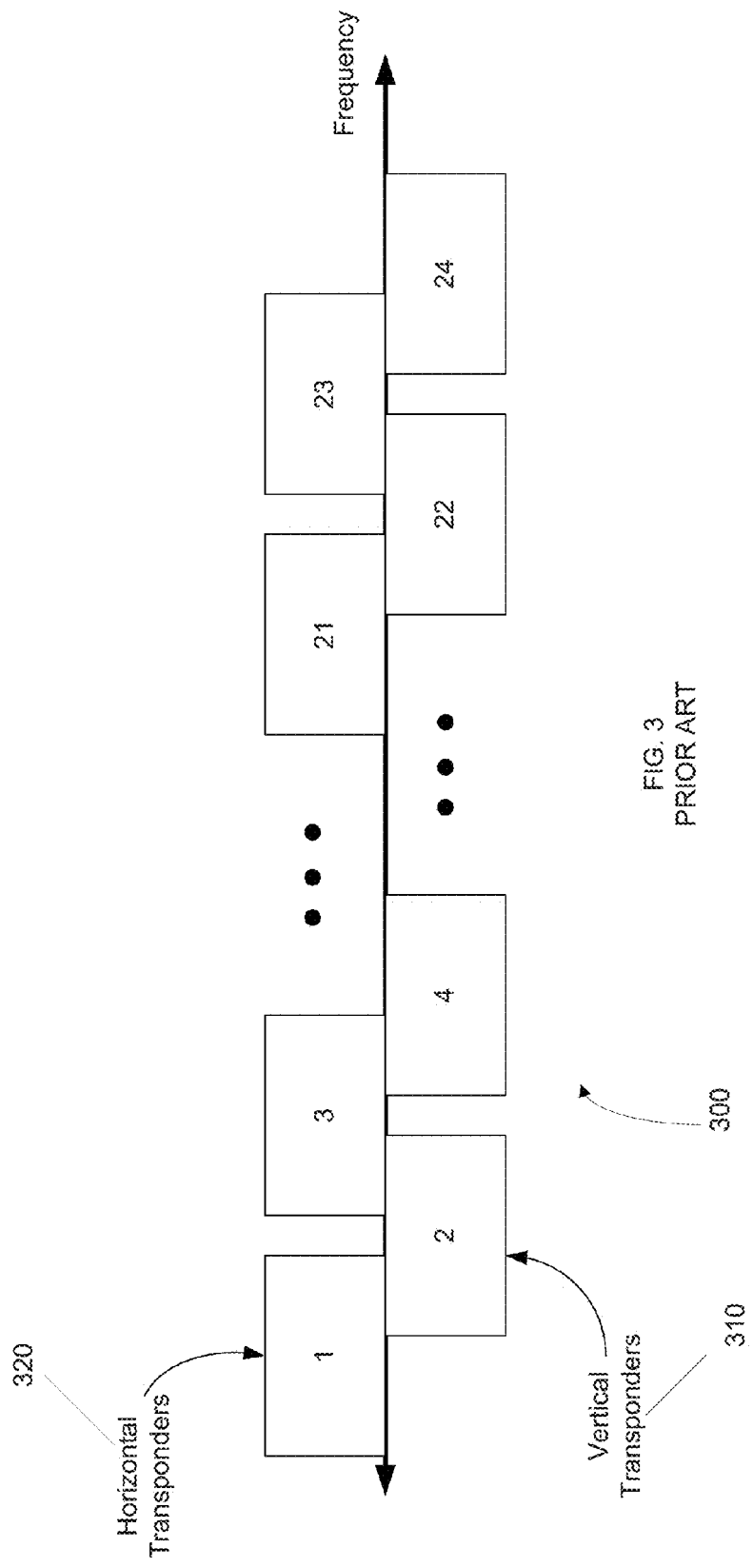
FIG. 3 shows an implementation of an exemplary arrangement of a satellite repeating relay with multiple transponders as found in the prior art.
Figure 4:
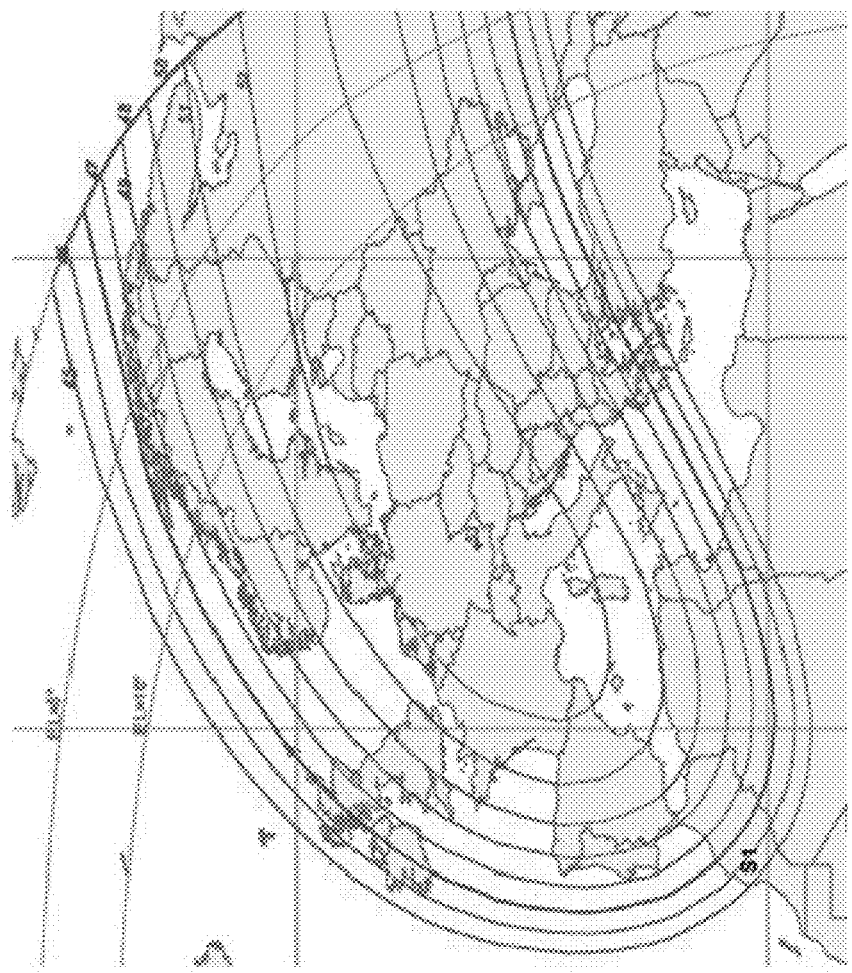
FIG. 4 shows an implementation of a satellite beam map showing effective isotropic radiated power (EIRP) contours.

FIG. 2 shows an example of a typical satellite repeating relay 130 that is comprised of a receive antenna 200 that has a known gain, various components within the satellite repeating relay, such as an ortho-mode transducer 210, a bandpass filter 220, a low-noise amplifier, an input multiplexer 240, a frequency converter 250, a linearizer 260, an amplifier 270, and an output multiplexer 280, and a transmit antenna 290 with a known gain. FIG. 3 shows a configuration of an implementation of a satellite repeating relay that has multiple transponders 300. Each transponder provides a particular bandwidth over which the spectrum of a satellite is supported. Satellites come in either linear or circular polarization, and there are two types of polarization supported on a satellite. For linear satellites, there is vertical or horizontal polarization using vertical 310 and horizontal 320 transponders, and for circular satellites, there is left-hand or right-hand polarization. The polarization allows for frequency re-use based on the selected polarization for transmitting and receiving to and from the satellite repeating relay130. In the art, many satellite operators do not provide the gain or performance of the various components of the satellite, but instead provides performance numbers known as G/T (gain over temperature) for the uplink and EIRP (effective isotropic radiated power) for the downlink. Satellite providers provide coverage maps (beam maps) that show the coverage area of the G/T or EIRP. A sample beam map is shown in FIG. 4. The user can look at the location on the beam plot and determine the EIRP for a given location. A G/T uplink map would appear to be similar, but may not follow the exact same contours as the downlink.

Figure 5:
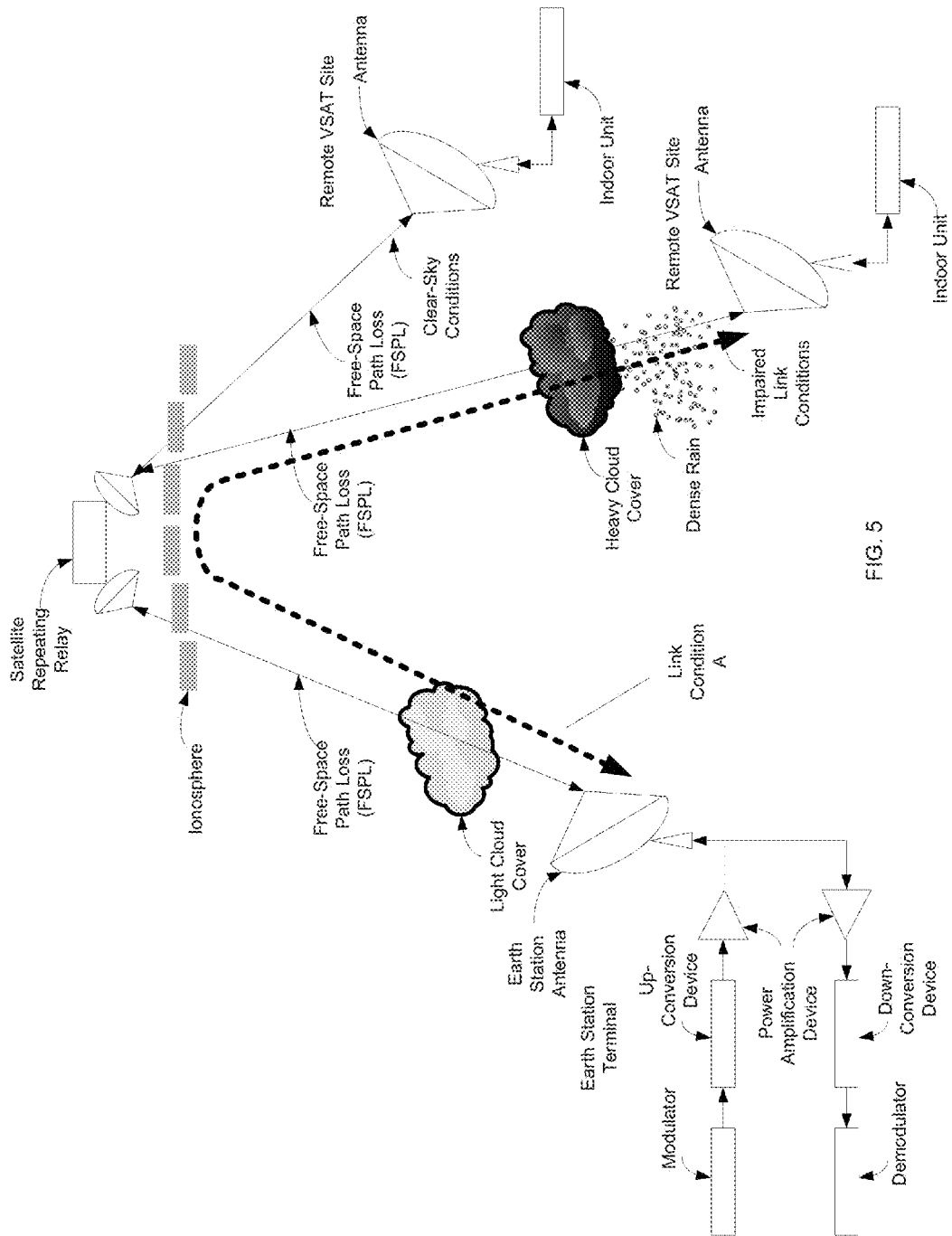
FIG. 5 shows an implementation in which a communications link is maintained in a region with heavy weather effects.
Figure 6:
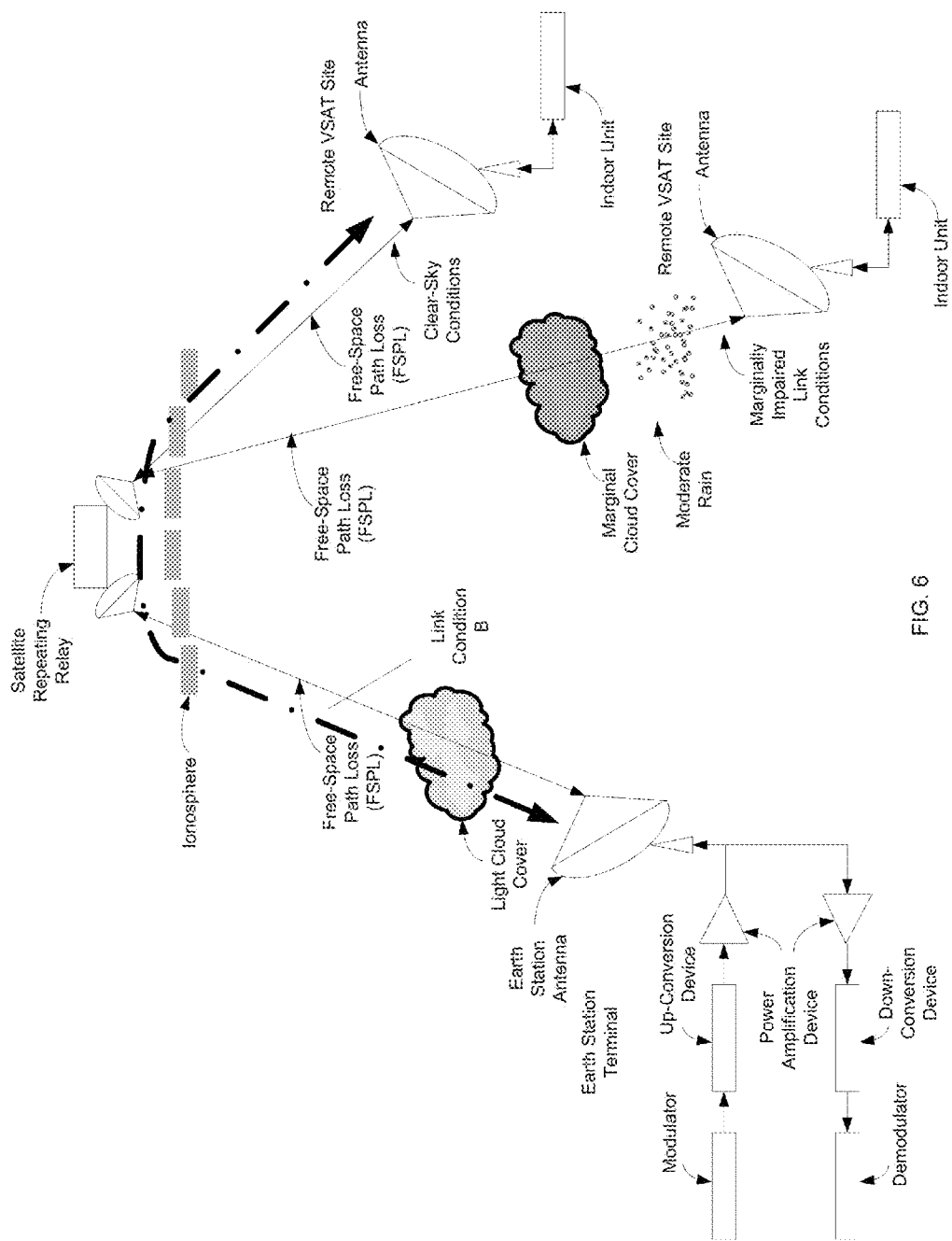
FIG. 6 shows an implementation in which a communications link is maintained in a region with marginal weather effects.
Figure 7:
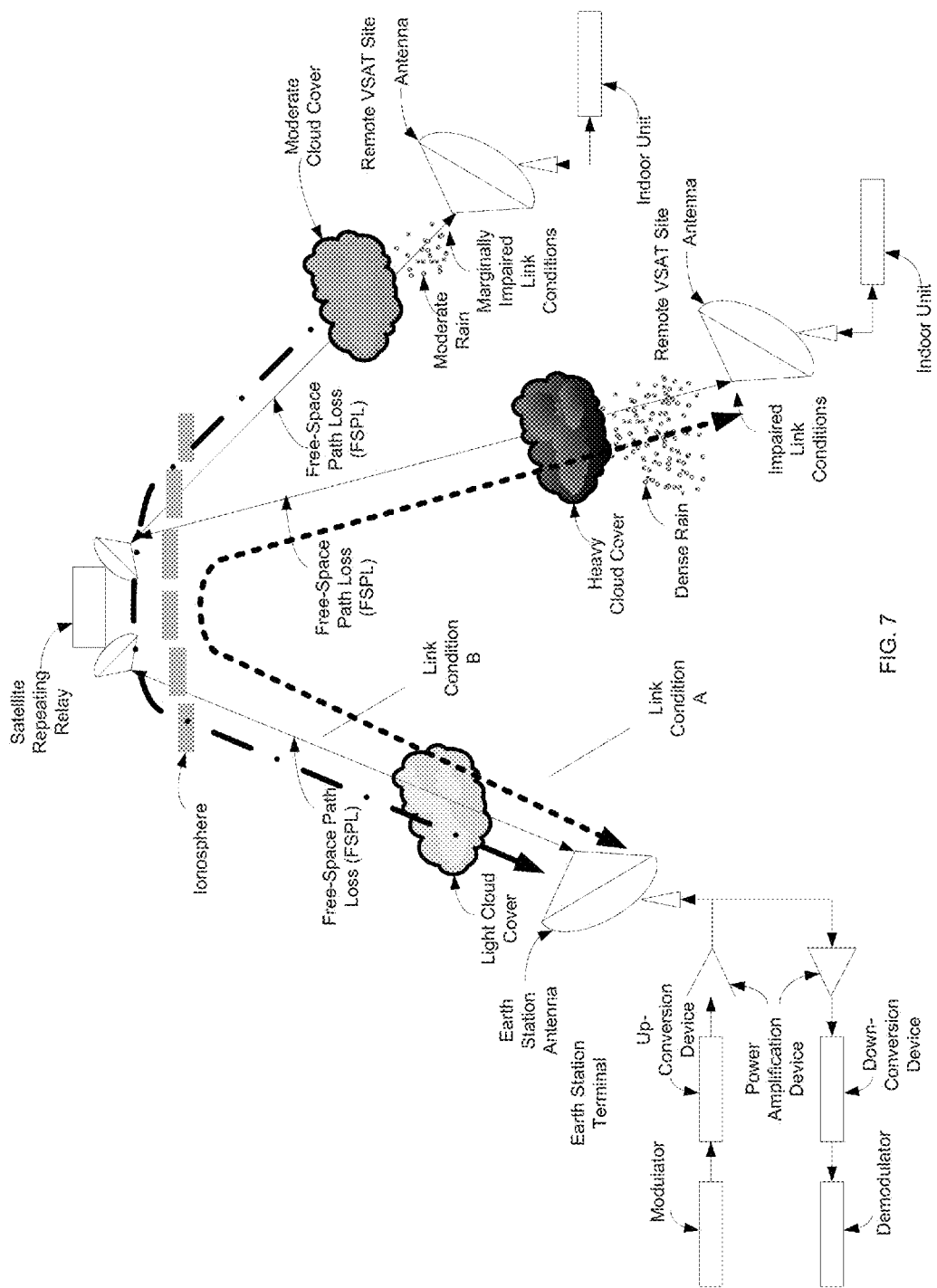
FIG. 7 shows an implementation in which a communications link is maintained in a region with both heavy and marginal weather effects.

FIGS. 5, 6, and 7 demonstrate three link configurations where link budgets may be applied. Traditionally, when performing LBAs, there is an LBA performed in each direction, so for each bi-directional link supported, there are two LBAs. For FIGS. 5 and 6, there are two LBAs for each site: one for the link between the earth station terminal and the remote; and one for the link between the remote site and the earth station terminal. For FIG. 7, there are four LBAs total, one for each segment of the communications links as shown. A standard LBA implementation is shown in FIGS. 8A-C where all the parameters are entered by the user and the result shows if the link can be closed. One of ordinary skill in the art would recognize the term "link closed" to mean that communications may be established between the end points of the LBA and may continue to be maintained at a desired availability.

Implementations of the disclosed method also may use a series of methods to further optimize an LBA. One such implementation may be broken down as follows:

Firstly, the LBA is performed with the desired modulation and FEC coding (Modulation and Coding also known as MODCOD) which may be selected by a transmission engineer. The MODCOD is chosen based on one or more estimates and is used to determine if the link may be closed. The desired MODCOD requires a known Symbol Energy/Noise Density (Es/No) ratio to support the modulation and coding format as shown in FIG. 13. The LBA is run with this "target" MODCOD as selected and the results are stored. An implementation of the method then uses a calculation to determine if the link has any spare energy to close the link at a higher MODCOD may exist. The excess may be determined by adding the Es/No for the link at the target MODCOD to the Excess Ratio as shown below:

Excess=Es/No for the link at the Target MODCOD+the Excess Ratio

Figure 9:
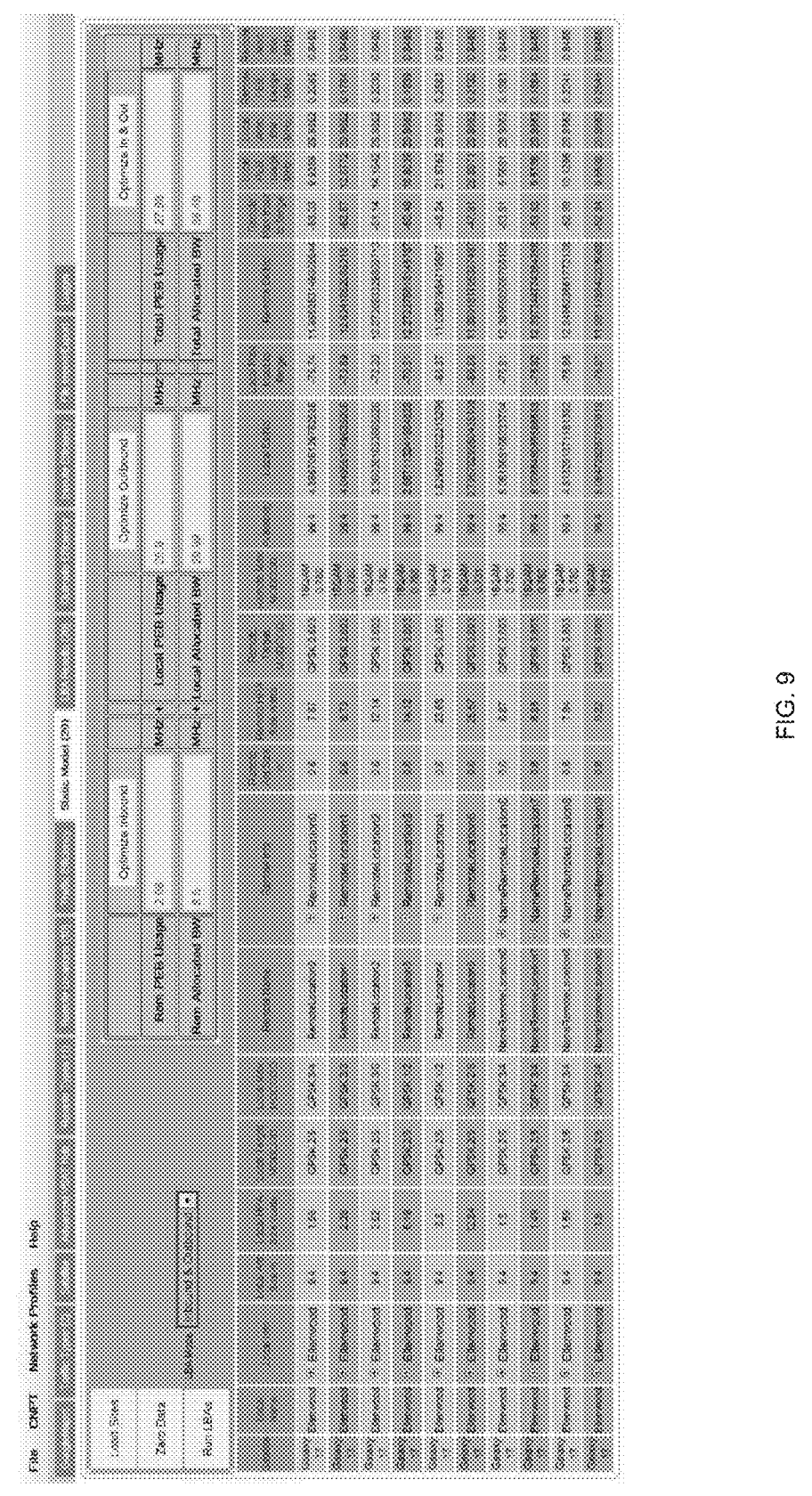

The Excess Ratio is based on the Allocated Bandwidth/Power Equivalent Bandwidth and is converted to Decibels by using the following ratio as $10*\text{Log}_{10}$ (Excess Ratio). As shown above, the Excess Ratio is then added to the target Es/No. The result is the target MODCOD with the excess ratio added which is the sum total that is used with a look up table to find the appropriate MODCOD (the Optimal MODCOD). Throughout this disclosure, the term "optimal MODCOD" may be used interchangeably with "MAX MODCOD." Even when implementations of the described methods are performed, the "optimal or MAX MODCOD" may be below the "Target MODCOD," but the resulting MODCOD will be true "optimal or MAX MODCOD." This optimization allows the LBA to "seek" the best MODCOD and notify the user that additional bandwidth (user bandwidth) or power may be possible when the excess (sum of the Es/No for the link at target MODCOD and the excess ratio) has a positive value. However, the user may run the LBA and the MODCOD may close below the target MODCOD resulting in a negative summed value, so in this case the user must lower the target MODCOD to ensure the link may close. In this scenario, there may not be an Excess Ratio to be used to obtain a better MODCOD. FIG. 9 shows a screenshot of an output resulting from the use of an implementation of the described method showing the Target and Optimal (MAX) MODCODs.

Figure 11:
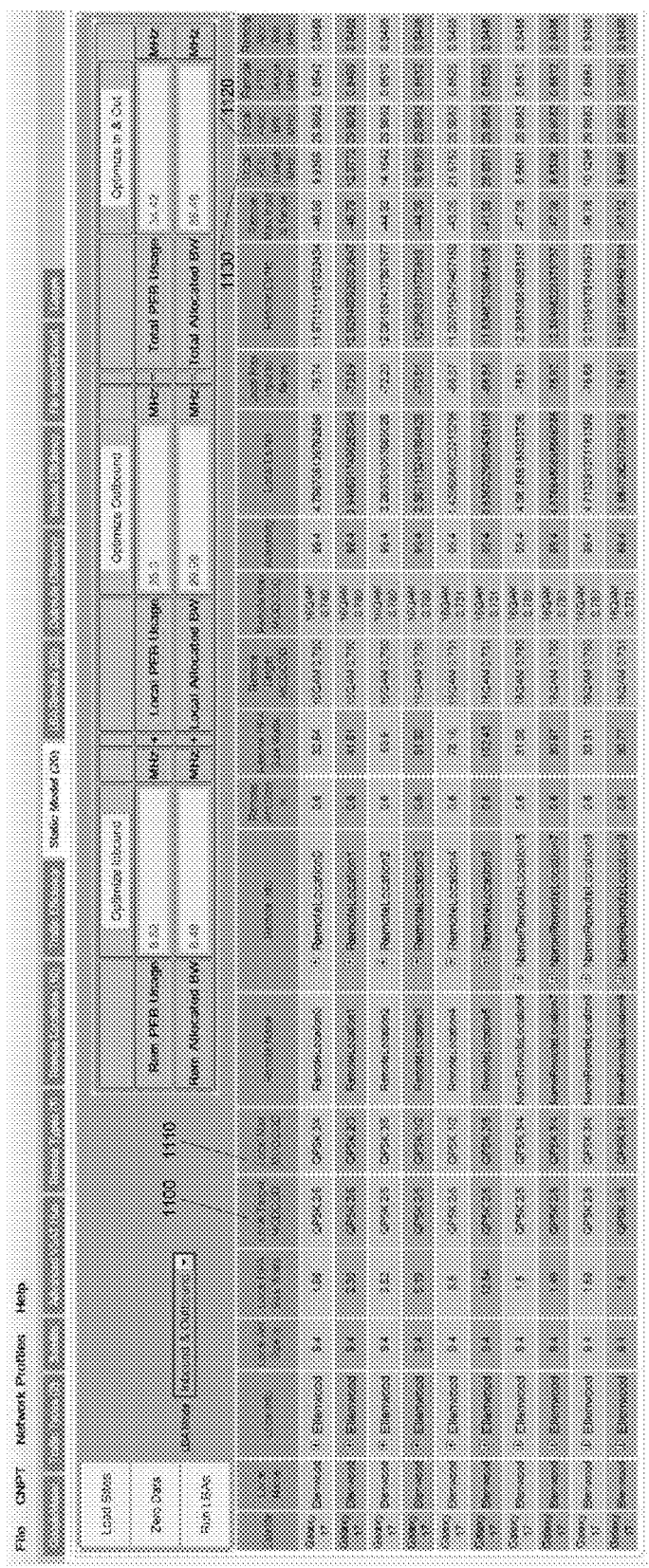
FIG. 11 shows an implementation of a LBA using an implementation of the described method that has been further optimized for only inbound communications links.

An example of an implementation of the method is as follows:

Using the results from FIG. 11, the "target" MODCOD 1100 was set to QPSK 2/5 (which requires an Es/No of 0.00 dB to close the link) for Remote0. After the first pass through the LBA tool, it was found that the "optimal" or as shown in the tool "MAX" 1110 is QPSK 3/4 which requires an Es/No 4.60 dB as shown in the chart of FIG. 13. The preferred procedure is to find the "Excess Ratio" by looking at the first pass through the LBA that show the Allocated Bandwidth 1120 of 29.9862 MHz and the Power Equivalent Bandwidth (PEB) usage 1130 of 9.9369. Converting the ratio to Decibels (dB):

Excess Ratio=Allocated Bandwidth/PEB=29.9862/9.9369=3.02

Converting Excess Ratio to dB=$10*\text{Log}_{10}$(Excess Ratio)=$10*\text{Log}_{10}$ (3.02)=4.80

The Excess Ratio is added to the Target MODCOD and yields:

QPSK 2/5 (Es/No=0)+Excess Margin(4.80 dB)=4.80 dB

Using FIG. 13 as a Look up Table (LUT), one can then look at the MODCOD using the "Round Down" to select a MODCOD having an Es/No that is the highest value that does not exceed the calculated excess and it is found that QPSK 3/4 with an Es/No of 4.60 would be the same or next lowest MODCOD. Therefore, the link is "optimized" for performance if the user chose QPSK 3/4 as the new optimal desired MODCOD.

A second example of an implementation of the method is as follows:

Using the results from FIG. 11, the target MODCOD 1100 was set to QPSK 2/5 (which requires an Es/No of 0.00 dB to close the link) for Remote3. As shown in FIG. 15, after the first pass through the LBA tool, it was found that the "optimal" or as shown in the tool "MAX" 1110 is QPSK 1/2 which requires an Es/No 1.3 dB. The "Excess Ratio" is then found by looking at the first pass through the LBA that show the Allocated Bandwidth of 29.9862 MHz and the Power Equivalent Bandwidth (PEB) usage of 16.6039. The ratio is then converted to Decibels (dB) in accordance with the following:

Excess Ratio=Allocated Bandwidth/PEB=29.9862/16.6039=1.81

Converting Excess Ratio to dB=$10*\text{Log}_{10}$(Excess Ratio)=$10*\text{Log}_{10}$ (3.02)=2.57

The Excess Ratio is then added to the Target MODCOD to yield:

QPSK 2/5 (Es/No=0)+Excess Margin (2.57 dB)=2.57 dB

Using FIG. 13 as a Look up Table (LUT), one can then look at the MODCOD "Round Down" to locate the MODCOD having the highest Es/No value that does not exceed 2.57 dB and it is found that QPSK 1/2 with an Es/No of 2.57 is the same or next lowest MODCOD. Even though rounding down is used, one could set a threshold to allow some variance to allow the next highest MODCOD to be chosen if the resulting value was within a configured range of dB variance. It is noteworthy that a user parameter may be added to allow the user to choose the amount of variance (positive or negative) for choosing the desired MODCOD. For example, suppose the MODCOD chosen was QPSK 1/2 with an Es/No of 1.3, but if some level of variance was allowed, such as 0.1 dB, then QPSK 3/5 may have been chosen, since the "round down" was utilized, and the next higher MODCOD was only 0.03 dB away. Given an acceptable margin of error, a variance may be more desirable instead of complete round down function. Therefore, the link would is "optimized" for performance if the user chooses QPSK 1/2 as the desired MODCOD.

In the existing art, to optimize a link, one must perform the LBA many times by hand using trial and error to attempt to make the PEB and allocated bandwidth equal or close to one another. A link is considered to be optimized when the allocated bandwidth and PEB are nearly equal. In this case, the allocated bandwidth and PEB are being used at "nearly perfect" balance or efficiency.

The cited examples show a LBA for a communications link in the outbound direction, but the same exercise may be performed for the inbound direction using the same or different MODCOD. In the cited examples, the outbound link uses DVB-S2, but the inbound links are using a different FEC that result in different Es/No requirements to close the link, but the procedures utilized are conducted in an identical manner. Therefore, FIG. 13 may further comprise a different look up table with modulation types, FEC rates, efficiencies, and required Es/No values required to close the link in accordance with the parameters of each link.

Figure 10:
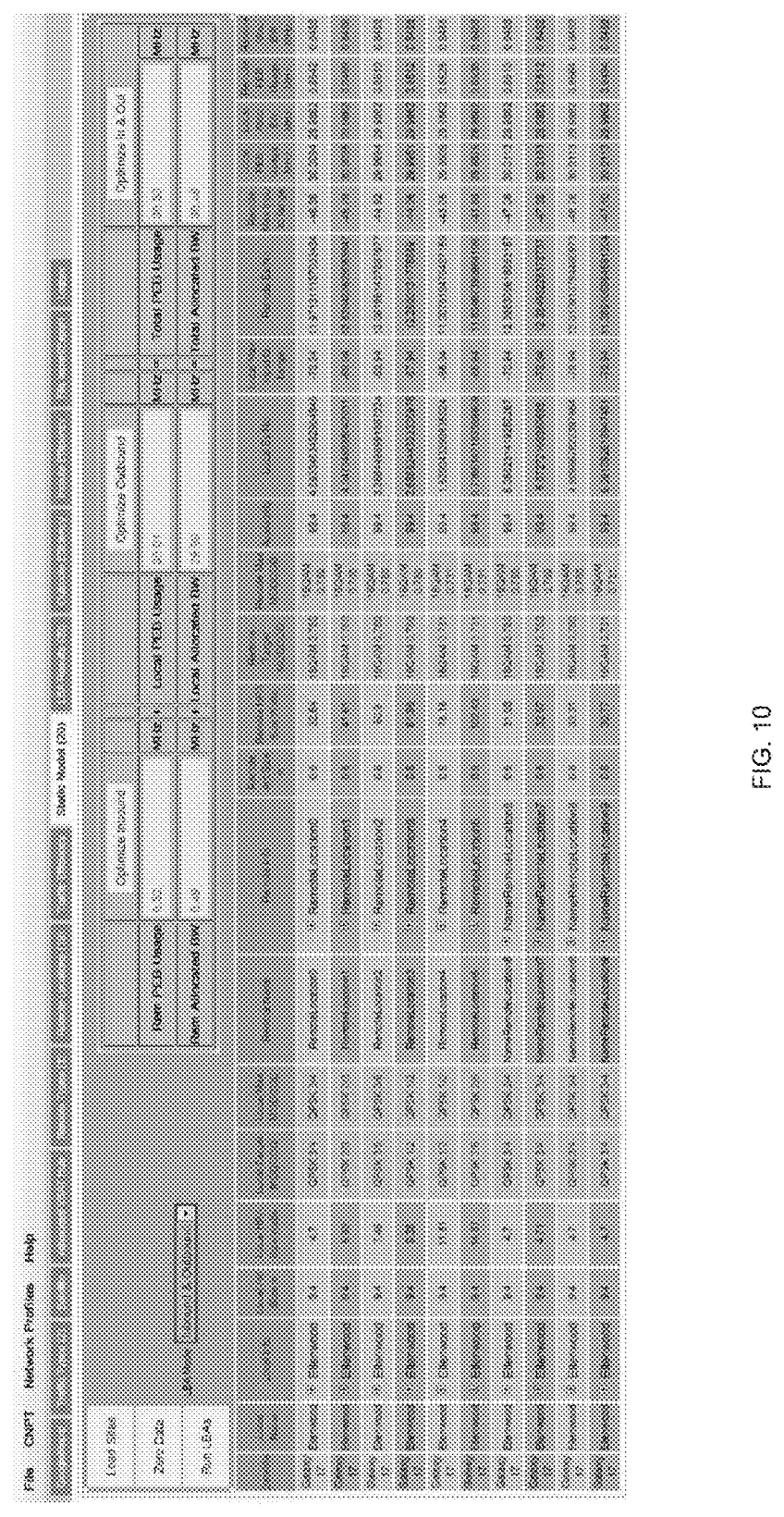

Another aspect of novelty of the disclosed system and method involves using a first implementation of the method of finding the optimal MODCOD in the following manner. If one uses the newly obtained "optimal MODCOD" using the first implementation of the method as illustrated by the examples above, and then re-runs the LBAs with the Target MODCOD replaced with the Optimal MODCOD, the net result is that by replacing the target with the optimal MODCOD using an implementation of the method, the allocated bandwidth and PEB bandwidth become "balanced." FIG. 10 shows an output resulting from performing the optimization using an implementation of the described method for both the inbound and outbound LBAs. When performing the optimization, the balancing (optimization) may stop when the Allocated Bandwidth/PEB ratio results in the excess margin being positive, but the model has reached the highest possible MODCOD. In this case, the model would no longer continue to optimize the LBA, since there are no more MODCODs to be used to increase efficiency. Conversely, the balancing (optimization) may cease (stop) when the Allocated/PEB ratio results in the excess margin being negative, but the model has reached the lowest possible MODCOD. In this case, the model would no longer continue to optimize the LBA, since there are no more MODCODs to be use to increase efficiency.

Another novel aspect of the system and method may be realized for a point-to-point link or an inbound link, such as for example, from a remote VSAT satellite to a hub earth station. The allocated bandwidth and PEB are summed for every link and the total is presented. The sum of all the links' allocated bandwidths and PEBs are summed to create a total allocated bandwidth and total PEB. However, for a common or shared link, such as for example, an outbound link from the hub earth station to the remote VSAT satellite, the allocated bandwidth and PEBs are not summed. Instead, for a shared link such as for example, a common or shared outbound link, the worst (most disadvantaged) link's allocated bandwidth and worst (most disadvantaged) link's PEB is used. A mathematical maximum function "MAX" may be used to search either the allocated bandwidth column or PEB bandwidth column of data to determine the highest value that is found in each respective column, which then becomes the value used for the allocated bandwidth and PEB values presented to the user. When running implementations of the described method for optimizing the LBA, these values become nearly equal or balanced.

Figure 12:
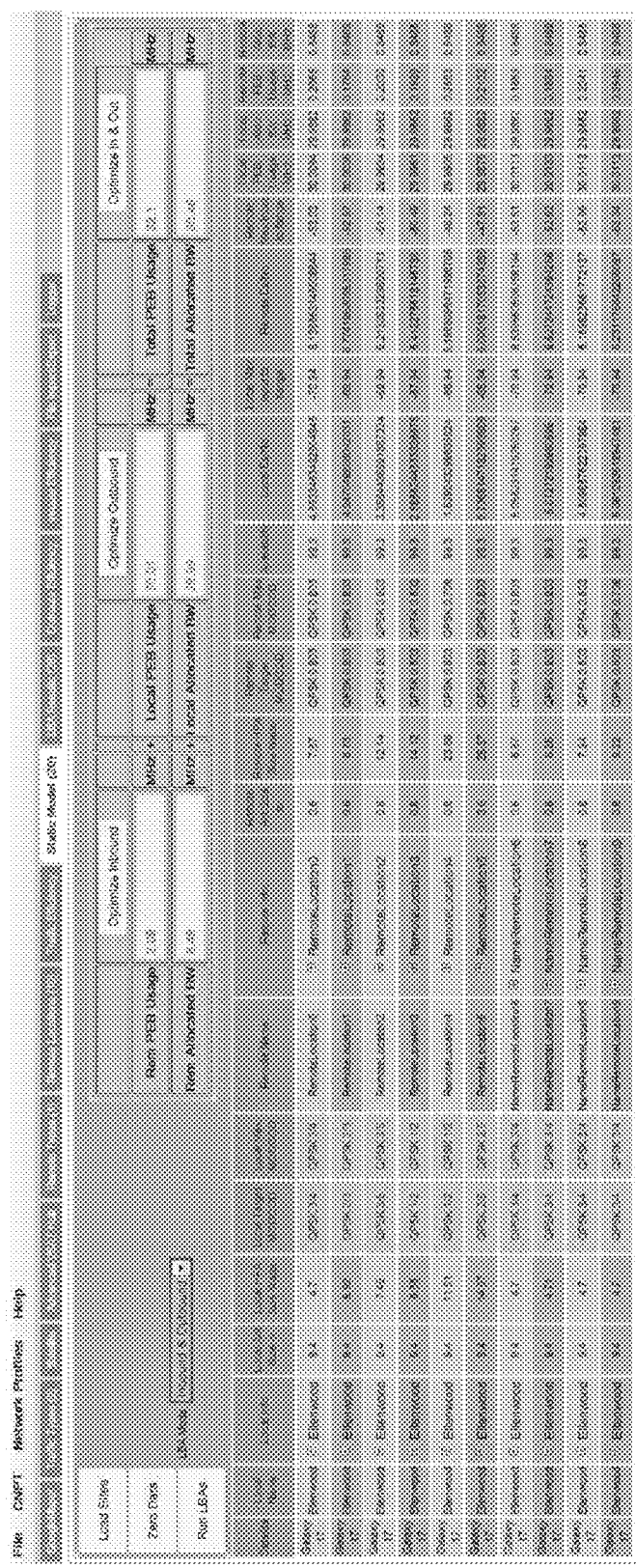
FIG. 12 shows an implementation of a LBA using an implementation of the described method that has been further optimized for only outbound communications links.

Implementations of the disclosed method can further be configured to allow the LBAs to be run for only inbound links as shown in FIG. 11 or only the outbound links as shown in FIG. 12. In all scenarios, when the optimization is performed, the links are fully optimized, meaning that the allocated bandwidth and PEB are balanced for every LBA that is configured.

As one of ordinary skill in the art will recognize, it is impossible to have a "perfectly balanced link," but the user may purposefully take any non-perfect bandwidth (allocated or PEB) and reallocate the overage to the other type of bandwidth, such as for example, if there is too much allocated bandwidth, it may be desirable to move some of this bandwidth to PEB bandwidth and vice versa.

The following are particular implementations with optimization techniques for satellite link budget analysis (LBA) implementations of such related methods which are provided as non-limiting examples of implementations of the disclosed systems and methods.

Example 1: A satellite earth station is being designed to operate at an assigned center frequency, symbol rate and polarization to a satellite repeating relay at a particular geo-equatorial location, polarization and frequency. For this example, the earth station terminal is supporting a point-to-multipoint configuration where the primary (hub) carrier is providing a common communications path to ten (10) remote terminals. Using an implementation of the described method, all of the parameters are entered into the LBA tool and the LBA is performed. Using an implementation of the described method, one may start with Target MODCODs and the result is the Optimal MODCOD that may be used for supporting communications to and from each remote location.

Example 2: In particular implementations of the system described in example 1, when the user desires to optimize both the inbound and outbound links, an implementation of the described method uses the Optimal MODCOD as the Target MODCOD and the one or more LBAs are then re-run. The result is that both the inbound and outbound links are optimized where the allocated bandwidth and PEB are balanced.

Example 3: In particular implementations of the system described in example 1, when the user desires to optimize the inbound links, an implementation of the described method uses the Optimal MODCOD as the Target MODCOD and the one or more LBAs are then re-run. The result is that the inbound links are optimized where the allocated bandwidth and PEB are balanced for only the inbound links and the outbound links remain as originally calculated.

Example 4: In particular implementations of the system described in example 1, when the user desires to optimize the outbound links, an implementation of the described method uses the Optimal MODCOD as the Target MODCOD and the one or more LBAs are then re-run. The result is that the outbound links are optimized where the allocated bandwidth and PEB are balanced for only the outbound links and the inbound links remain as originally calculated.

In places where the description above refers to particular implementations of telecommunication systems and techniques for transmitting data across a telecommunication channel, it should be readily apparent that a number of modifications may be made without departing from the spirit thereof and that these implementations may be applied to other to telecommunication systems and techniques for transmitting data across a telecommunication channel.

The invention claimed is:

1. A method of optimizing a link budget analysis (LBA) for a communications link comprising:

performing, using a processor, a first LBA based on a target modulation and coding pair (MODCOD) that is selected based on one or more transmission or receiving link parameters, the MODCOD having a predetermined symbol energy to noise density ratio (Es/No);

calculating, using the processor, a ratio of allocated bandwidth to a power equivalent bandwidth (PEB) for the communications link and converting the calculated ratio to Decibels;

determining whether additional energy is present in the communications link by summing the Es/No for the communications link at the target MODCOD and the calculated ratio of allocated bandwidth to PEB using the processor;

accessing a look up table (LUT) to determine an optimal MODCOD for the communications link wherein:
 if the sum is a positive value, selecting a MODCOD having a higher Es/No; and
 if the sum is a negative value, selecting a MODCOD having a lower Es/No; and altering one or more transmission or receiving parameters to apply the selected optimal MODCOD; and performing a plurality of first LBAs based on a plurality of target MODCODs for a plurality of links sharing a common transmission or receiving hub;

calculating a ratio of allocated bandwidth to a power equivalent bandwidth (PEB) a maximum allocated bandwidth from among the plurality of links and a maximum PEB from among the plurality of links and converting the calculated ratio to Decibels; and determining whether additional energy is present in the plurality of communications links by summing the Es/No for the most disadvantaged communications link at the target MODCOD and the calculated ratio of allocated bandwidth to PEB based on the maximum allocated bandwidth and PEB from among the plurality of links.

2. The method of claim 1 further comprising performing a second LBA using the optimal MODCOD.

3. The method of claim 2, wherein the allocated bandwidth and PEB are substantially equal when the optimal MODCOD is used when performing the second LBA.

4. The method of claim 1, wherein the optimal MODCOD selected has an Es/No that is a highest value among possible MODCODS without exceeding the sum of the Es/No of the target MODCOD and the calculated ratio of allocated bandwidth to PEB.

5. The method of claim 1, wherein the optimal MODCOD selected has an Es/No that exceeds the sum of the Es/No of the target MODCOD and the calculated ratio of allocated bandwidth to PEB by an amount that is within a predetermined range of variance of the sum.

6. The method of claim 1, further comprising:

performing a plurality of first LBAs based on a plurality of target MODCODs for a plurality of communications links; and summing the calculated ratios of allocated bandwidth to PEB for all of the communications links to result in a total allocated bandwidth and a total PEB.

7. The method of claim 1, wherein the communications link is a forward link over which communications are transmitted from a local transmitter to a remote receiver.

8. The method of claim 1, wherein the communications link is a return link over which communications are transmitted from a local receiver to a remote transmitter.

9. The method of claim 1, wherein the method is performed using both a forward link over which communications are transmitted from a local transmitter to a remote receiver and a return link over which communications are transmitted from a local receiver to a remote transmitter.

10. A system for optimizing a link budget analysis (LBA) for a communications link comprising:

a transmitter configured to transmit a communications signal;

a receiver configured to receive the communications signal and create a communications link between the transmitter and receiver, the receiver and transmitter located remotely from each other; and a processor configured to:
 perform a first LBA based on a target modulation and coding pair (MODCOD) that is selected based on one or more transmission or receiving link parameters, the MODCOD having a predetermined symbol energy to noise density ratio (Es/No);
 calculate a ratio of allocated bandwidth to a power equivalent bandwidth (PEB) for the communications link and converting the calculated ratio to Decibels;
 determine whether additional energy is present in the communications link by summing the Es/No for the communications link at the target MODCOD and the calculated ratio of allocated bandwidth to PEB;
 access a look up table (LUT) to determine an optimal MODCOD for the communications link wherein:
  if the sum is a positive value, a MODCOD having a higher Es/No is selected; and
  if the sum is a negative value, a MODCOD having a lower Es/No is selected; and
 alter one or more transmission or receiving parameters to apply the selected optimal MODCOD; and
 perform a plurality of first LBAs based on a plurality of target MODCODs for a plurality of links sharing a common transmission or receiving hub;
 calculate a ratio of allocated bandwidth to a power equivalent bandwidth (PEB) a maximum allocated bandwidth from among the plurality of links and a maximum PEB from among the plurality of links and converting the calculated ratio to Decibels; and
 determine whether additional energy is present in the plurality of communications links by summing the Es/No for the most disadvantaged communications link at the target MODCOD and the calculated ratio of allocated bandwidth to PEB based on the maximum allocated bandwidth and PEB from among the plurality of links.

11. The system of claim 10 wherein the processor if further configured to perform a second LBA using the optimal MODCOD.

12. The system of claim 11, wherein the allocated bandwidth and PEB are substantially equal when the optimal MODCOD is used when the second LBA is performed.

13. The system of claim 10, wherein the optimal MODCOD selected has an Es/No that is a highest value among possible MODCODS without exceeding the sum of the Es/No of the target MODCOD and the calculated ratio of allocated bandwidth to PEB.

14. The system of claim 10, wherein the optimal MODCOD selected has an Es/No that exceeds the sum of the Es/No of the target MODCOD and the calculated ratio of allocated bandwidth to PEB by an amount that is within a predetermined range of variance of the sum.

15. The system of claim 10, wherein the processor is further configured to:
  perform a plurality of first LBAs based on a plurality of target MODCODs for a plurality of communications links; and
  sum the calculated ratios of allocated bandwidth to PEB for all of the communications links to result in a total allocated bandwidth and a total PEB.

16. The system of claim 10, wherein the communications link is a forward link over which communications are transmitted from a local transmitter to a remote receiver.

17. The system of claim 10, wherein the communications link is a return link over which communications are transmitted from a local receiver to a remote transmitter.

18. The system of claim 10, wherein the processor if further configured to use both a forward link over which communications are transmitted from a local transmitter to a remote receiver and a return link over which communications are transmitted from a local receiver to a remote transmitter.

19. The system of claim 14, wherein the predetermined range of variance is a user-adjustable parameter.

20. The system of claim 14, wherein the predetermined range of variance is a user-adjustable parameter.

\* \* \* \* \*